United States Patent
Nagasawa

(10) Patent No.: US 12,330,498 B2
(45) Date of Patent: Jun. 17, 2025

(54) VEHICLE CONTROL APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/544,207

(22) Filed: Dec. 18, 2023

(65) Prior Publication Data
US 2024/0217336 A1 Jul. 4, 2024

(30) Foreign Application Priority Data
Dec. 28, 2022 (JP) .................. 2022-211030

(51) Int. Cl.
| B60K 20/06 | (2006.01) |
| B60W 10/04 | (2006.01) |
| B60W 10/10 | (2012.01) |

(52) U.S. Cl.
CPC ............. *B60K 20/06* (2013.01); *B60W 10/04* (2013.01); *B60W 10/10* (2013.01)

(58) Field of Classification Search
CPC ........ B60K 20/06; B60W 10/04; B60W 10/10
See application file for complete search history.

(56) References Cited

U.S. PATENT DOCUMENTS

| 2020/0047756 A1* | 2/2020 | Yoo ................... B60W 50/0098 |
| 2021/0122371 A1* | 4/2021 | Choi .................. B60W 10/188 |
| 2024/0066982 A1* | 2/2024 | Suzuki ............... F16H 61/0213 |

FOREIGN PATENT DOCUMENTS

JP 2005343278 A * 12/2005

* cited by examiner

*Primary Examiner* — Minnah L Seoh
*Assistant Examiner* — Gregory T Prather
(74) *Attorney, Agent, or Firm* — Rimon P.C.

(57) ABSTRACT

A vehicle control apparatus includes a paddle switch, a traveling mode selection unit, and an electronic control unit. The paddle switch is provided on each side of a steering wheel in a vehicle width direction of a vehicle. The paddle switch is configured to allow for a shift change operation or a traveling speed increasing and decreasing operation. The traveling mode selection unit is configured to allow a driver who drives the vehicle to select a desired traveling mode from traveling modes. The electronic control unit is configured to change an operation mode of the paddle switch to the shift change operation or the traveling speed increasing and decreasing operation based on information supplied from the traveling mode selection unit, and is configured to control corresponding one of a shift change and a traveling speed based on an operation performed on the paddle switch.

5 Claims, 9 Drawing Sheets

VEHICLE CONTROL APPARATUS

CROSS-REFERENCE TO RELATED APPLICATIONS

The present application claims priority from Japanese Patent Application No. 2022-211030 filed on Dec. 28, 2022, the entire contents of which are hereby incorporated by reference.

BACKGROUND

The disclosure relates to a vehicle control apparatus.

Recently, vehicles have been provided with various vehicle control apparatuses to improve maneuverability, traveling stability, or safety in automated driving control of a vehicle. A technique to assist driving of a driver who drives the vehicle has thus been put into practical use.

In order to allow the driver to focus on driving, a technique to make an operation on the vehicle easier is also put into practical use. For example, a paddle switch is sometimes provided at a position that is on a vehicle front side of a steering wheel and on each side of the steering wheel in a vehicle width direction. The paddle switch is configured to allow the driver to perform an upshifting operation or a downshifting operation while holding the steering wheel.

For example, Japanese Unexamined Patent Application Publication (JP-A) No. 2005-343278 discloses a technique using such a paddle switch. In the technique disclosed in JP-A No. 2005-343278, a left-hand operation member and a right-hand operation member are each provided at a steering column or a steering wheel. The left-hand operation member is operable by a left hand gripping the steering wheel. The right-hand operation member is operable by a right hand gripping the steering wheel. When one of the left-hand operation member and the right-hand operation member is operated, a preset value for a preceding vehicle following control is increased. When another of the left-hand operation member and the right-hand operation member is operated, the preset value is decreased. Further, disclosed is a technique in which the left-hand operation member and the right-hand operation member are used as both operation members for the preceding vehicle following control and operation members for a gear ratio control. For example, reference is made to JP-A No. 2005-343278.

SUMMARY

An aspect of the disclosure provides a vehicle control apparatus that includes a paddle switch, a traveling mode selection unit and an electronic control unit. The paddle switch is provided on each side of a steering wheel in a vehicle width direction of a vehicle. The paddle switch is configured to allow for a shift change operation or a traveling speed increasing and decreasing operation. The traveling mode selection unit is configured to allow a driver who drives the vehicle to select a desired traveling mode from traveling modes. The electronic control unit is configured to change an operation mode of the paddle switch to the shift change operation or the traveling speed increasing and decreasing operation based on information supplied from the traveling mode selection unit, and is configured to control corresponding one of a shift change and a traveling speed based on an operation performed on the paddle switch.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
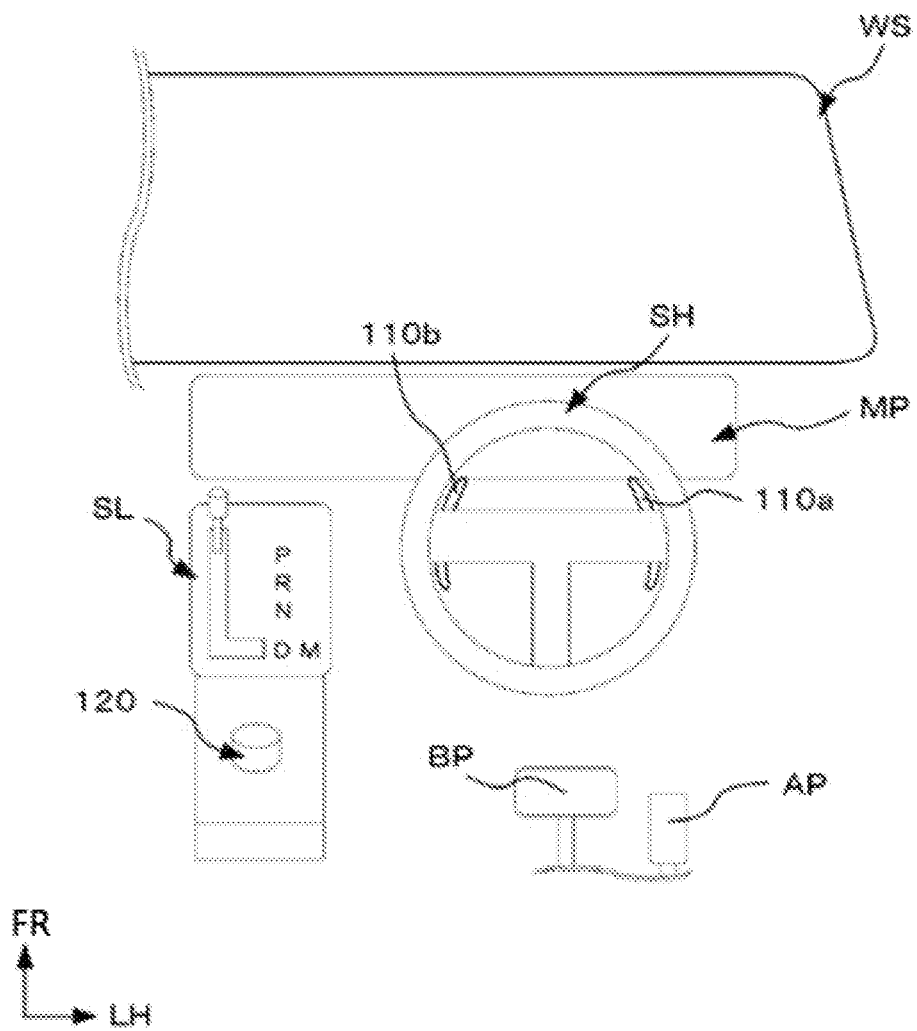
FIG. 1 is a schematic diagram of a vehicle V in which a vehicle control apparatus 1 according to one example embodiment of the disclosure is to be mounted, viewed in a direction from an inside of the vehicle V to a front side of the vehicle V.

In an automated driving control, a vehicle control apparatus may acquire information regarding a condition of a road surface on which a vehicle is traveling to assist a driver who drives the vehicle. However, for example, when the vehicle is traveling on a rough road having a greatly uneven road surface such as an unpaved road, the driver may be to perform a complicated operation not performed in usual traveling, including, without limitation, a steering operation, an acceleration and deceleration operation, and a wheel slip control.

In a technique disclosed in JP-A No. 2005-343278, when a preceding vehicle following control is performed, a set value for the preceding vehicle following control may be increased or decreased in response to reception of an operation performed on an operation member. When a shift position of a transmission is at a manual mode position, a gear ratio (a shift change) may be controlled based on the operation performed on the operation member. When the shift position of the transmission is at a drive mode position, preceding vehicle following may be controlled.

However, when a condition of a road surface on which a vehicle is traveling or a traveling mode changes, a driver who drives the vehicle may be to change a content of a control from a shift change control to a preceding vehicle following control or a gear ratio control, based on the traveling mode. This can make the driver's operation more complicated.

It is desirable to provide a vehicle control apparatus that makes a vehicle operation based on a road surface condition easier.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Referring to FIGS. 1 to 10, a description is provided below of a vehicle V to which any of vehicle control apparatuses 1, 1A, and 1B according to example embodiments of the disclosure is applied. An arrow FR illustrated in the drawings where appropriate may indicate a front direction of the vehicle V illustrated in FIG. 1, and an arrow LH may indicate a left direction in the front view. In the following description, an upper-lower direction, a front-rear direction, and a right-left direction may refer to an upper-lower direction in the front view, a front-rear direction in the front view, and a right-left direction in the front view, respectively, unless otherwise stated.

First Example Embodiment

Referring to FIGS. 1 to 4, a description is provided of a configuration of the vehicle control apparatus 1 according to an example embodiment. The vehicle control apparatus 1 may be provided in the vehicle V.

As illustrated in FIG. 1, the vehicle V may be provided with a meter panel MP, a gear shift lever SL, a steering wheel SH, an accelerator pedal AP, and a brake pedal BP on a vehicle rear side of a windshield WS. The meter panel MP may display information including, without limitation, a traveling speed, a remaining amount of a fuel, and operation information. The steering wheel SH may be provided with a paddle switch 110. The paddle switch 110 may include paddle switches 110a and 110b. For example, a console may be provided with a traveling mode selection unit 120.

The gear shift lever SL may be provided with a "P" range, an "R" range, an "N" range, and a "D" range that are to be selected by a driver P who drives the vehicle V and indicate a parking range, a reverse range, a neutral range, and an automated gear shift range, respectively. In some example embodiments, the gear shift lever SL may be further provided with an "M" range indicating a manual gear shift range. Operation information related to the gear shift lever SL may be transmitted to a shift processor 20.

The paddle switches 110a and 110b included in the paddle switch 110 may be provided on respective two opposed sides of the steering wheel SH in the vehicle width direction. The driver P may use the paddle switch 110 to perform a shift change operation or a traveling speed increasing and decreasing operation of the vehicle V. The paddle switch 110 may be a switch that receives a request made by the driver P, such as a request for a shift operation, a request for increasing and decreasing of the traveling speed of the vehicle V, or a request for braking of the vehicle V. For example, the paddle switch 110a may be provided on a right side of the steering wheel SH in the vehicle width direction, and the paddle switch 110b may be provided on a left side of the steering wheel SH in the vehicle width direction. Operation information related to the paddle switch 110 may be transmitted to an electronic control unit (ECU) 200. The paddle switch 110 may be biased toward a vehicle front side, for example. When the paddle switch 110 is not operated, the paddle switch 110 may be in an OFF state.

The traveling mode selection unit 120 may be a switch that allows the driver P to select a desired traveling mode from a plurality of traveling modes. The traveling mode selection unit 120 may be, for example, a push switch or a dial switch, and may be provided in the console. Operation information related to the traveling mode selection unit 120 may be transmitted to the ECU 200. For example, assigned to the traveling mode selection unit 120 may be an operation to turn on or off a "rough-road traveling mode". In one embodiment, the rough-road traveling mode may serve as a "first traveling mode". For example, when the traveling mode selection unit 120 is in an ON state, the "rough-road traveling mode" may be selected. When the traveling mode selection unit 120 is in an OFF state, a "normal traveling mode" may be selected.

Here, the "rough-road traveling mode" may be a traveling mode suitable for traveling on a rough road such as a snowy road, a muddy road, or a gravel road. In the "rough-road traveling mode", a traction control of wheels may be performed automatedly. In the "rough-road traveling mode", for example, the ECU 200 may detect whether any of the wheels is slipping by means of a wheel speed sensor provided on each of the wheels, and an acceleration processor 10 or a braking processor 30 may perform a drive control of each of the wheels.

[Configuration of Vehicle Control Apparatus 1]

Figure 2:
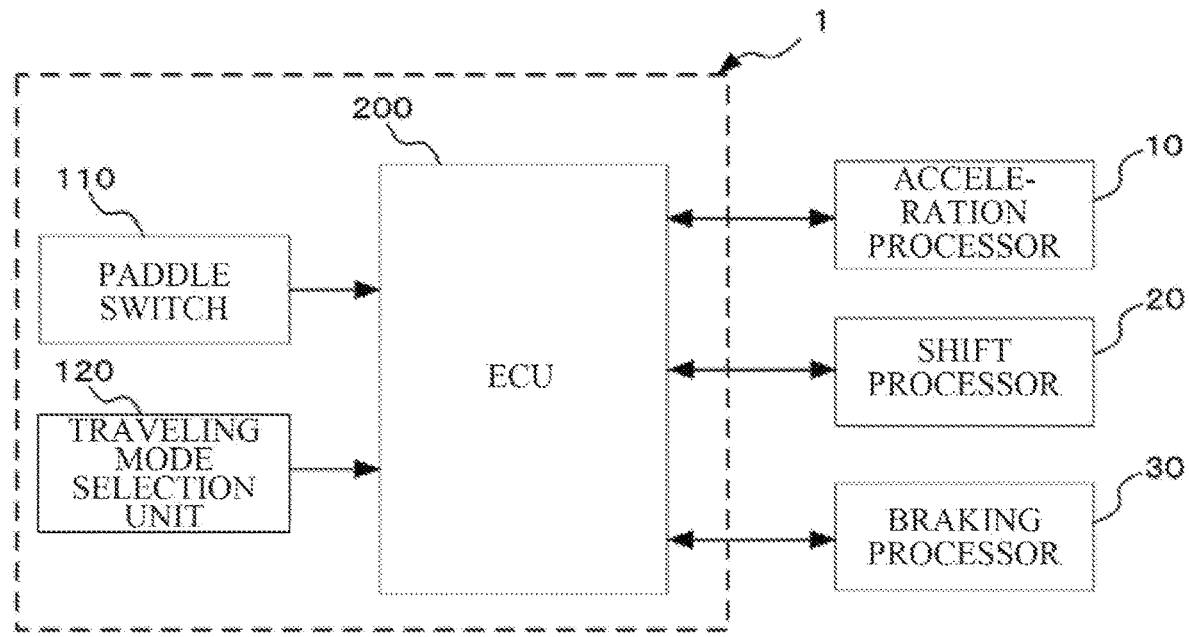
FIG. 2 is a configuration diagram illustrating the vehicle control apparatus 1 according to one example embodiment of the disclosure.

As illustrated in FIG. 2, the vehicle control apparatus 1 may include the paddle switch 110, the traveling mode selection unit 120, and the ECU 200. Coupled to the vehicle control apparatus 1 may be the acceleration processor 10, the shift processor 20, and the braking processor 30.

The acceleration processor 10 may control acceleration or deceleration regarding the traveling speed of the vehicle V as a control of the traveling speed, based on information supplied from the paddle switch 110 or the accelerator pedal AP.

The shift processor 20 may control a shift range of a transmission of the vehicle V, based on an operation of selecting the shift range performed on the gear shift lever SL.

The braking processor 30 may perform the deceleration control regarding the traveling speed of the vehicle V or stop the vehicle V as the control of the traveling speed, based on information supplied from the paddle switch 110 or the brake pedal BP.

[Configuration of ECU 200]

Figure 3:
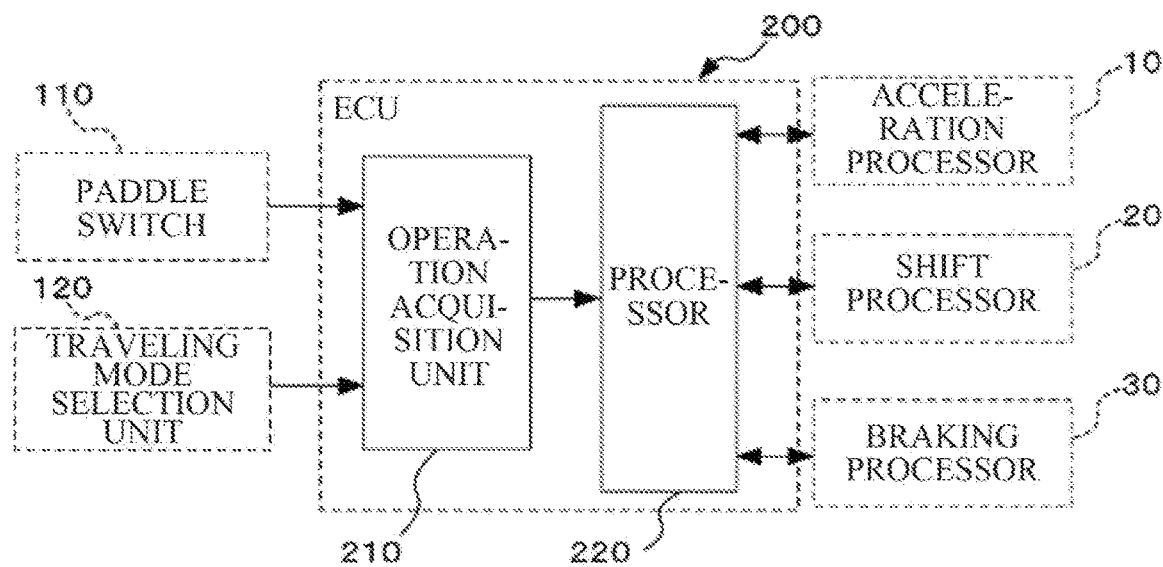
FIG. 3 is a configuration diagram illustrating an electronic control unit (ECU) of the vehicle control apparatus 1 according to one example embodiment of the disclosure.

As illustrated in FIG. 3, the ECU 200 may include an operation acquisition unit 210 and a processor 220. Coupled to the ECU 200 may be the paddle switch 110, the traveling mode selection unit 120, the acceleration processor 10, the shift processor 20, and the braking processor 30.

The operation acquisition unit 210 may acquire respective pieces of operation information transmitted from the paddle switch 110 and the traveling mode selection unit 120, and may transmit the respective pieces of operation information related to the paddle switch 110 and the traveling mode selection unit 120 to the processor 220. Coupled to the operation acquisition unit 210 may be the paddle switch 110, the traveling mode selection unit 120, and the processor 220.

The operation acquisition unit 210 may receive, for example, information indicating whether the operation performed on the paddle switch 110 is ON or OFF, or information as a numerical value representing an amount of the operation performed on the paddle switch 110. The operation acquisition unit 210 may transmit the operation information related to the paddle switch 110 to the processor 220, based on the information received from the paddle switch 110. In other words, for example, the operation acquisition unit 210 may acquire information indicating whether the paddle switch 110a or the paddle switch 110b is turned on, and may transmit the operation information related to the paddle switch 110 to the processor 220. Alternatively, for example, the operation acquisition unit 210 may acquire information regarding an amount of an operation performed on the paddle switch 110a or the paddle switch 110b, convert the acquired information into a numerical value representing the amount of the operation, and thereafter transmit, to the processor 220, the numerical value after the conversion as the operation information.

For example, when the paddle switch 110a and the paddle switch 110b are pulled together toward the vehicle rear side, the operation acquisition unit 210 may acquire respective pieces of information regarding the amounts of operations performed on the paddle switch 110a and the paddle switch 110b. The operation acquisition unit 210 may convert each of the acquired pieces of information regarding the amounts of the operations into a numerical value representing the amount of the operation, and may thereafter transmit, to the processor 220, the numerical value after the conversion as the operation information.

The processor 220 may include, for example, a read-only memory (ROM) and a random-access memory (RAM) as unillustrated storages. The ROM may contain a control program, for example. The RAM may contain various kinds of data, for example. The processor 220 may perform an overall control of the vehicle control apparatus 1 based on the control program contained in the storages. Coupled to the processor 220 may be the operation acquisition unit 210, the acceleration processor 10, the shift processor 20, and the braking processor 30.

The processor 220 may receive respective pieces of information from the paddle switch 110 and the traveling mode selection unit 120 via the operation acquisition unit 210. The processor 220 may change the operation mode of the paddle switch 110 to the shift change operation or the traveling speed increasing and decreasing operation based on the information supplied from the traveling mode selection unit 120. The processor 220 may control the shift change or the traveling speed based on the operation information related to the paddle switch 110.

For example, based on the selected traveling mode, the processor 220 may assign, to the operation mode of the paddle switch 110, one of the shift change operation and the traveling speed increasing and decreasing operation that is frequently used. When the operation mode of the paddle switch 110 is assigned to the shift change operation, the processor 220 may transmit shift change control information to the shift processor 20 based on the operation information related to the paddle switch 110, and may control the shift change. The shift change control information may indicate, for example, upshifting or downshifting.

When the operation mode of the paddle switch 110 is assigned to the traveling speed increasing and decreasing operation, the processor 220 may transmit acceleration control information to the acceleration processor 10 based on the operation information related to the paddle switch 110, and may control the traveling speed. The acceleration control information may indicate, for example, increasing of the traveling speed or decreasing of the traveling speed. For example, when receiving information indicating that the paddle switch 110a and the paddle switch 110b are pulled together toward the vehicle rear side, the processor 220 may transmit braking control information to the braking processor 30 based on the operation information related to the paddle switch 110, and may control the traveling speed. The braking control information may indicate, for example, decreasing of the traveling speed or turning on of the brake.

When the "rough-road traveling mode" is selected as the traveling mode, the processor 220 may control the traveling speed based on the operation information related to the paddle switch 110. In one embodiment, the rough-road traveling mode may serve as the "first traveling mode".

For example, when the "rough-road traveling mode" is selected by the traveling mode selection unit 120, the processor 220 may assign the traveling speed increasing and decreasing operation to the operation mode of the paddle switch 110. The processor 220 may transmit the acceleration control information to the acceleration processor 10 based on the operation information related to the paddle switch 110 that has been received from the operation acquisition unit 210, and may control the traveling speed.

When a braking operation or an acceleration operation is performed on a vehicle device other than the paddle switch 110 while the processor 220 is controlling the traveling speed based on the operation information related to the paddle switch 110, the processor 220 may change the control based on the operation information related to the paddle switch 110 from the control of the traveling speed to the control of the shift change.

For example, when the "rough-road traveling mode" is selected as the traveling mode, the processor 220 may assign the traveling speed increasing and decreasing operation to the operation mode of the paddle switch 110. When the brake pedal BP is operated while the traveling speed increasing and decreasing operation is assigned to the operation mode of the paddle switch 110, the processor 220 may receive, from the braking processor 30, information indicating that the brake pedal BP is operated. Further, the processor 220 may assign the shift change operation to the operation mode of the paddle switch 110 to thereby change the control based on the operation information related to the paddle switch 110 from the control of the traveling speed to the control of the shift change. When the accelerator pedal AP is operated while the traveling speed increasing and decreasing operation is assigned to the operation mode of the paddle switch 110, the processor 220 may receive, from the acceleration processor 10, information indicating that the accelerator pedal AP is operated. Further, the processor 220 may assign the shift change operation to the operation mode of the paddle switch 110 to thereby change the control based on the operation information related to the paddle switch 110 from the control of the traveling speed to the control of the shift change.

In addition, the processor 220 may determine whether the vehicle Vis traveling, based on the respective pieces of information supplied from the acceleration processor 10, the shift processor 20, and the braking processor 30.

[Process to be Performed by ECU 200]

Figure 4:
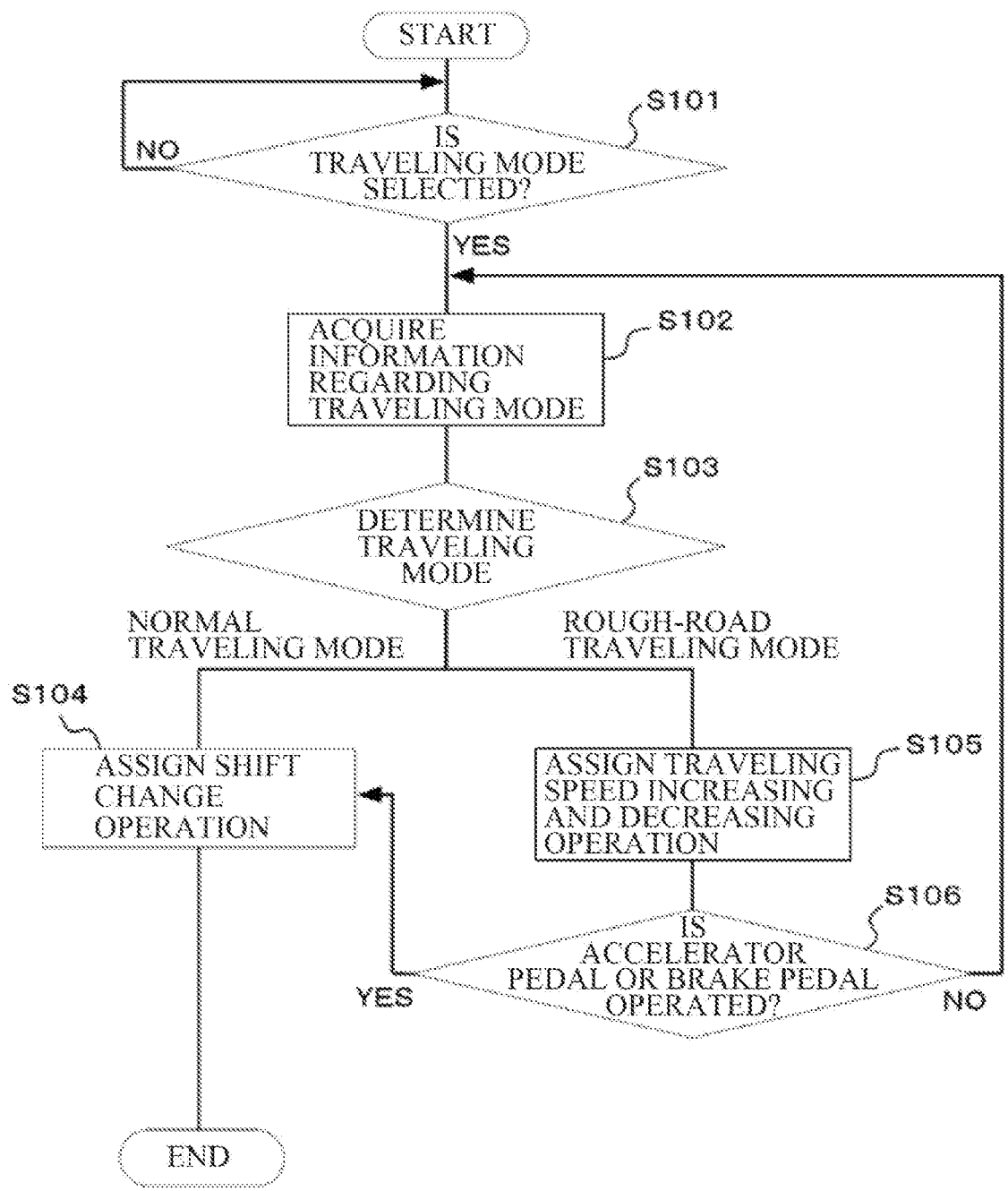
FIG. 4 is a flowchart illustrating a process to be performed by the ECU of the vehicle control apparatus 1 according to one example embodiment of the disclosure.

Referring to FIG. 4, a process to be performed by the ECU 200 will be described.

The processor 220 may determine whether the traveling mode is selected by the traveling mode selection unit 120 (step S101).

If the processor 220 determines that the traveling mode is not selected (step S101: NO), the processor 220 may cause the process to return to step S101.

If the processor 220 determines that the traveling mode is selected (step S101: YES), the processor 220 may acquire, via the operation acquisition unit 210, information regarding the traveling mode selected by the traveling mode selection unit 120 (step S102), and may determine the traveling mode based on the acquired information (step S103).

If the selected traveling mode is the "normal traveling mode" (step S103: "NORMAL TRAVELING MODE"), the processor 220 may assign the shift change operation to the operation mode of the paddle switch 110 (step S104). Thereafter, the processor 220 may end the process.

If the selected traveling mode is the "rough-road traveling mode" (step S103: "ROUGH-ROAD TRAVELING MODE"), the processor 220 may assign the traveling speed increasing and decreasing operation to the operation mode of the paddle switch 110 (step S105), and may determine whether the accelerator pedal AP or the brake pedal BP is operated (step S106).

If the processor 220 determines that the accelerator pedal AP or the brake pedal BP is not operated (step S106: NO), the processor 220 may cause the process to return to step S102.

If the accelerator pedal AP or the brake pedal BP is operated (step S106: YES), the processor 220 may assign the shift change operation to the operation mode of the paddle switch 110 (step S104). Thereafter, the processor 220 may end the process.

[Workings and Example Effects]

As described above, the vehicle control apparatus 1 according to the example embodiment includes the paddle switch 110, the traveling mode selection unit 120, and the processor 220. The paddle switch 110 may include the paddle switches 110a and 110b provided on the respective sides of the steering wheel SH in the vehicle width direction. The paddle switch 110 allows for the shift change operation or the traveling speed increasing and decreasing operation. The traveling mode selection unit 120 allows the driver P who drives the vehicle V to select a desired traveling mode from the plurality of traveling modes. The processor 220 changes the operation mode of the paddle switch 110 to the shift change operation or the traveling speed increasing and decreasing operation based on the information supplied from the traveling mode selection unit 120, and controls corresponding one of the shift change and the traveling speed based on the operation information related to the paddle switch 110.

That is, the driver P may select the traveling mode by the traveling mode selection unit 120 based on the road surface condition. Based on the traveling mode selected by the driver P, the processor 220 may assign, to the operation mode of the paddle switch 110, one of the shift change operation and the traveling speed increasing and decreasing operation that is frequently used. Further, the processor 220 may control the shift change or the increasing and decreasing of the traveling speed, based on the information supplied from the paddle switch 110. This makes it possible for the driver P to perform, via the paddle switch 110, one of the shift change operation and the traveling speed increasing and decreasing operation that is frequently used in the selected traveling mode.

The vehicle control apparatus 1 thus makes it possible to make a vehicle operation based on a road surface condition easier.

In the vehicle control apparatus 1 according to the example embodiment, when the "rough-road traveling mode" is selected as the desired traveling mode, the processor 220 may control the traveling speed based on the operation information related to the paddle switch 110. In one embodiment, the "rough-road traveling mode" may serve as the "first traveling mode". The first traveling mode may be the traveling mode in which the traction control of the wheels is performed automatedly.

That is, when the driver P selects the "rough-road traveling mode", the processor 220 may assign the traveling speed increasing and decreasing operation, which is frequently used, to the operation mode of the paddle switch 110. This may allow the driver P to perform, via the paddle switch 110, the traveling speed increasing and decreasing operation that is frequently used in the selected "rough-road traveling mode".

The vehicle control apparatus 1 thus makes it possible to make the vehicle operation based on the road surface condition easier.

In the vehicle control apparatus 1 according to the example embodiment, the processor 220 may change the control based on the operation information related to the paddle switch 110 from the control of the traveling speed to the control of the shift change when the braking operation or the acceleration operation is performed on corresponding one of the brake pedal BP and the acceleration pedal AP that is a vehicle device other than the paddle switch 110 while the processor 220 is controlling the traveling speed based on the operation information related to the paddle switch 110.

That is, the processor 220 may prioritize the braking operation performed on the brake pedal BP that the driver P is operating or the acceleration operation performed on the accelerator pedal AP that the driver P is operating. Accordingly, the processor 220 may change the control based on the operation information related to the paddle switch 110 from the control of the traveling speed to the control of the shift change. This may allow the driver P to easily perform the traveling speed increasing and decreasing operation through the braking operation performed on the brake pedal BP that the driver P is operating or the acceleration operation performed on the accelerator pedal AP that the driver P is operating.

It is thus possible to make the vehicle operation based on the road surface condition easier.

Second Example Embodiment

Figure 5:
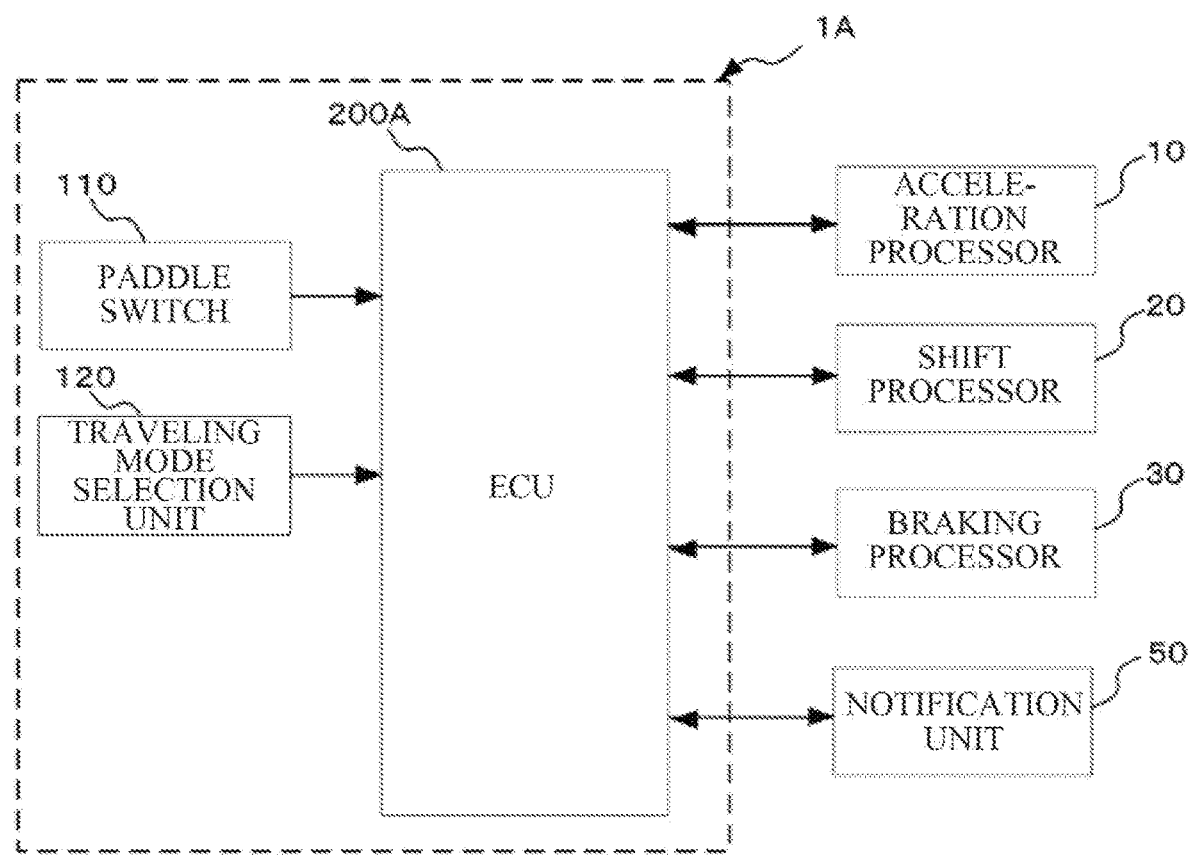
FIG. 5 is a configuration diagram illustrating a vehicle control apparatus 1A according to one example embodiment of the disclosure.
Figure 6:
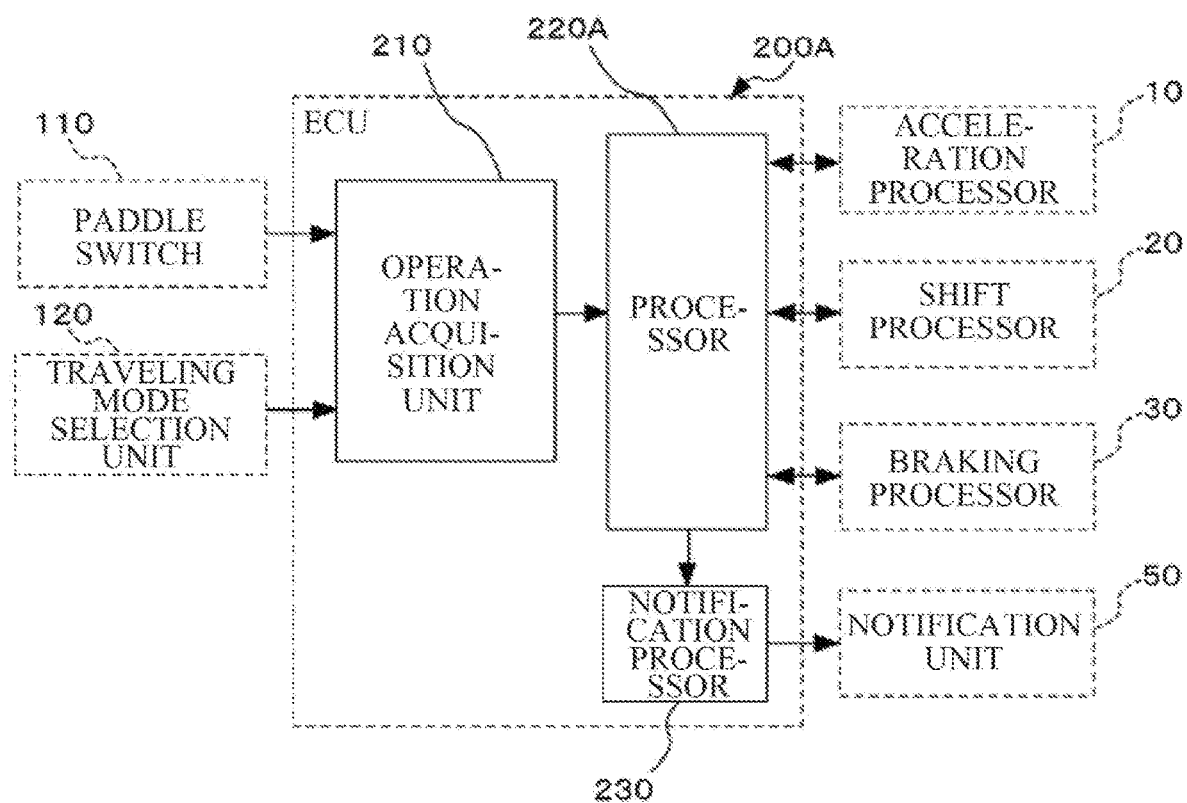
FIG. 6 is a configuration diagram illustrating an ECU of the vehicle control apparatus 1A according to one example embodiment of the disclosure.
Figure 7:
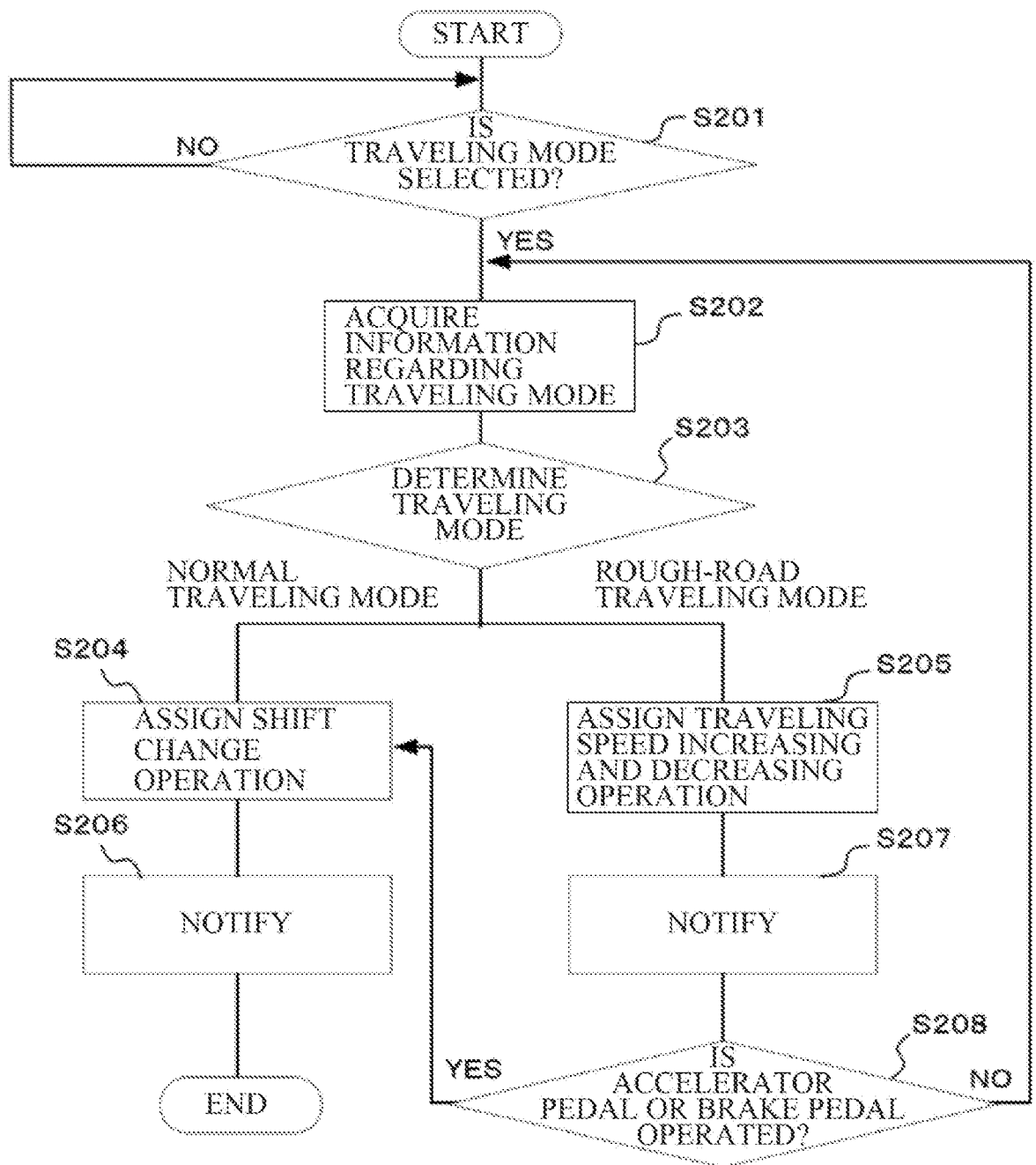
FIG. 7 is a flowchart illustrating a process to be performed by the ECU of the vehicle control apparatus 1A according to one example embodiment of the disclosure.

Referring to FIGS. 5 to 7, a description is provided of a configuration of the vehicle control apparatus 1A according to an example embodiment of the disclosure. The vehicle control apparatus 1A may be provided in the vehicle V.

[Configuration of Vehicle Control Apparatus 1A]

As illustrated in FIG. 5, the vehicle control apparatus 1A may include the paddle switch 110, the traveling mode selection unit 120, and an ECU 200A. Coupled to the vehicle control apparatus 1A may be the acceleration processor 10, the shift processor 20, the braking processor 30, and a notification unit 50.

The notification unit 50 may notify the driver P of information indicating that the operation mode of the paddle switch 110 is changed, based on the information received from the ECU 200A. The notification unit 50 may notify the driver P of such information, for example, by means of information displayed on the meter panel MP or audio information outputted from an unillustrated audio speaker.

For example, when the notification unit 50 receives, from the ECU 200A, information indicating that the operation mode of the paddle switch 110 is changed from the shift change operation to the traveling speed increasing and decreasing operation, the notification unit 50 may notify the driver P of information indicating that the operation mode of the paddle switch 110 is changed from the shift change operation to the traveling speed increasing and decreasing operation. When the notification unit 50 receives, from the ECU 200A, information indicating that the operation mode of the paddle switch 110 is changed from the traveling speed increasing and decreasing operation to the shift change operation, the notification unit 50 may notify the driver P of information indicating that the operation mode of the paddle switch 110 is changed from the traveling speed increasing and decreasing operation to the shift change operation.

When the notification unit 50 receives, from the ECU 200A, information indicating that the driver P has performed the braking operation on the brake pedal BP or the acceleration operation on the accelerator pedal AP, the notification unit 50 may notify the driver P of the information indicating that the operation mode of the paddle switch 110 is changed to the shift change operation.

[Configuration of ECU 200A]

As illustrated in FIG. 6, the ECU 200A may include the operation acquisition unit 210, a processor 220A, and a notification processor 230. Coupled to the ECU 200A may be the paddle switch 110, the traveling mode selection unit 120, the acceleration processor 10, the shift processor 20, the braking processor 30, and the notification unit 50.

Coupled to the processor 220A may be the operation acquisition unit 210, the notification processor 230, the acceleration processor 10, the shift processor 20, and the braking processor 30.

When the processor 220A changes the operation mode of the paddle switch 110 from the traveling speed increasing and decreasing operation to the shift change operation, or when the processor 220A changes the operation mode of the paddle switch 110 from the shift change operation to the traveling speed increasing and decreasing operation, the processor 220A may notify, via the notification unit 50, the driver P of information indicating that the operation mode of the paddle switch 110 is to be changed.

For example, when the processor 220A changes the operation mode of the paddle switch 110 from the traveling speed increasing and decreasing operation to the shift change operation, the processor 220A may transmit information indicating that the operation mode of the paddle switch 110 is to be changed from the traveling speed increasing and decreasing operation to the shift change operation, to the notification unit 50 via the notification processor 230. Alternatively, when the processor 220A changes the operation mode of the paddle switch 110 from the control of the shift change to the control of the traveling vehicle, the processor 220A may transmit information indicating that the operation mode of the paddle switch 110 is to be changed from the shift change operation to the traveling speed increasing and decreasing operation, to the notification unit 50 via the notification processor 230. Further, the notification unit 50 may notify the driver P of information indicating that the operation mode of the paddle switch 110 is to be changed from the shift change operation or the traveling speed increasing and decreasing operation, by means of image information via the meter panel MP or the audio information via the speaker.

Coupled to the notification processor 230 may be the processor 220A and the notification unit 50. The notification processor 230 may transmit the image information or the audio information to the notification unit 50 based on information received from the processor 220A.

For example, when the notification processor 230 receives, from the processor 220A, information indicating that the operation mode of the paddle switch 110 is changed to the shift change operation or the traveling speed increasing and decreasing operation, the notification processor 230 may transmit image information or audio information to the notification unit 50, based on the received information.

[Process to be Performed by ECU 200A]

Referring to FIG. 7, a process to be performed by the ECU 200A will be described.

The processor 220A may determine whether the traveling mode is selected by the traveling mode selection unit 120 (step S201). If the processor 220A determines that the traveling mode is not selected (step S201: NO), the processor 220A may cause the process to return to step S201.

If the processor 220A determines that the traveling mode is selected (step S201: YES), the processor 220A may acquire information regarding the selected traveling mode via the operation acquisition unit 210 (step S202), and may determine the traveling mode based on the acquired information (step S203).

If the selected traveling mode is the "normal traveling mode" (step S203: "NORMAL TRAVELING MODE"), the processor 220A may assign the shift change operation to the operation mode of the paddle switch 110 (step S204).

Further, the processor 220A may notify, via the notification unit 50, the driver P of information indicating that the shift change operation is assigned to the operation mode of the paddle switch 110 (step S206). Thereafter, the processor 220A may end the process.

If the selected traveling mode is the "rough-road traveling mode" (step S203: "ROUGH-ROAD TRAVELING MODE"), the processor 220A may assign the traveling speed increasing and decreasing operation to the operation mode of the paddle switch 110 (step S205).

Further, the processor 220A may notify, via the notification unit 50, the driver P of information indicating that the traveling speed increasing and decreasing operation is assigned to the operation mode of the paddle switch 110 (step S207). Thereafter, the processor 220A may cause the process to proceed to step S208.

The processor 220A may determine whether the accelerator pedal AP or the brake pedal BP is operated (step S208). If the processor 220A determines that the accelerator pedal AP or the brake pedal BP is not operated (step S208: NO), the processor 220A may cause the process to return to step S202.

If the processor 220A determines that the accelerator pedal AP or the brake pedal BP is operated (step S208: YES), the processor 220A may cause the process to proceed to step S204, and assign the shift change operation to the operation mode of the paddle switch 110 (step S204).

Further, the processor 220A may notify, via the notification unit 50, the driver P of the information indicating that the shift change operation is assigned to the operation mode of the paddle switch 110 (step S206). Thereafter, the processor 220A may end the process.

[Workings and Example Effects]

As described above, the vehicle control apparatus 1A according to the example embodiment may further include the notification unit 50 and the notification processor 230 coupled to the notification unit 50. The notification unit 50 may perform a notification to the driver P. When the processor 220A changes the operation mode of the paddle switch 110 from the traveling speed increasing and decreasing operation to the shift change operation or from the shift change operation to the traveling speed increasing and decreasing operation, the processor 220A may notify, via the notification unit 50, the driver P of the information indicating that the operation mode of the paddle switch 110 is to be changed to the shift change operation or the information indicating that the operation mode of the paddle switch 110 is to be changed to the traveling speed increasing and decreasing operation.

That is, the processor 220A may notify the driver P that the operation mode of the paddle switch 110 is changed based on the selected traveling mode, via the notification unit 50 by means of the image information or the audio information. This makes it possible to allow the driver P to easily recognize the operation assigned to the paddle switch 110.

It is therefore possible to make the vehicle operation based on the road surface condition easier.

[Modifications]

Figure 8:
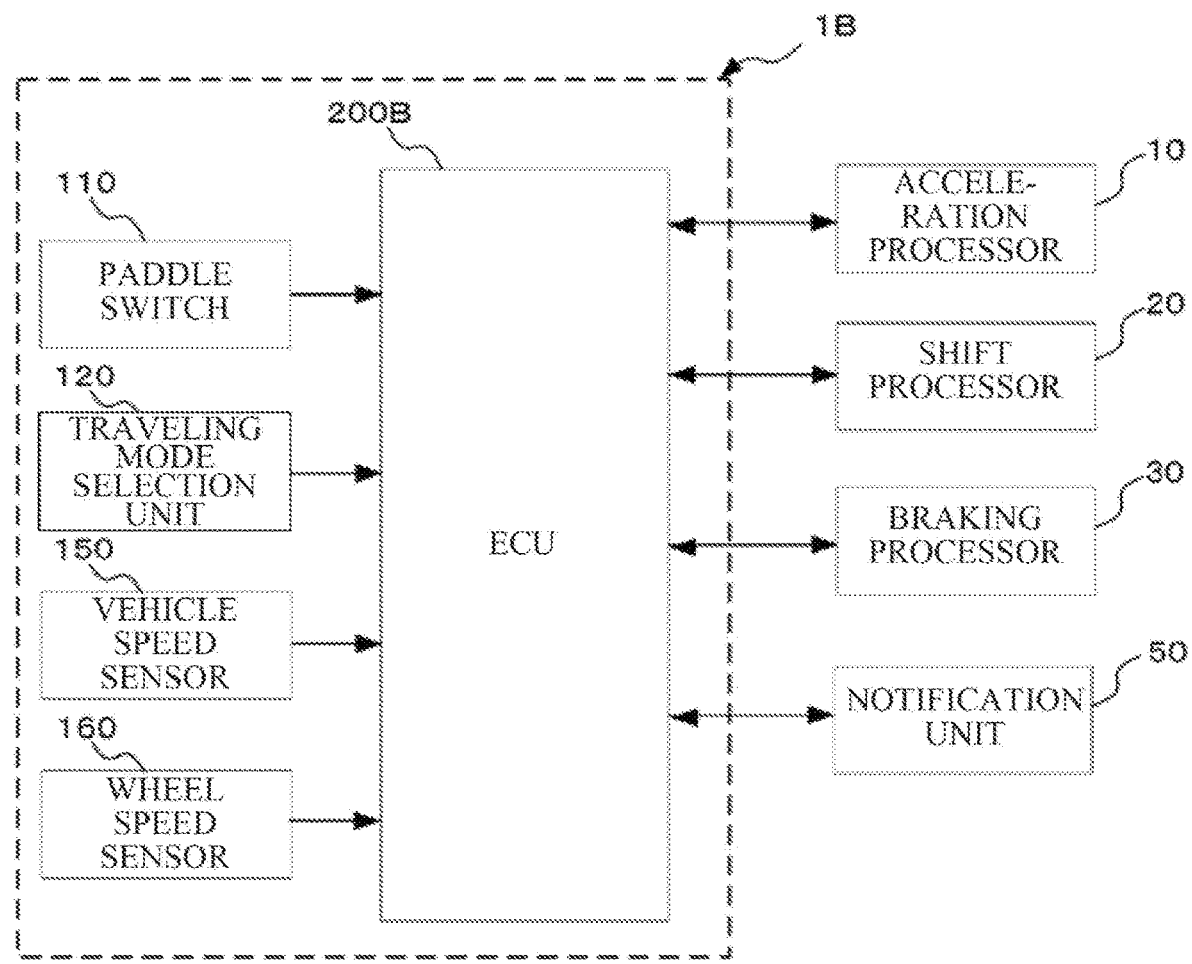
FIG. 8 is a configuration diagram illustrating a vehicle control apparatus 1B according to a modification of one example embodiment of the disclosure.
Figure 9:
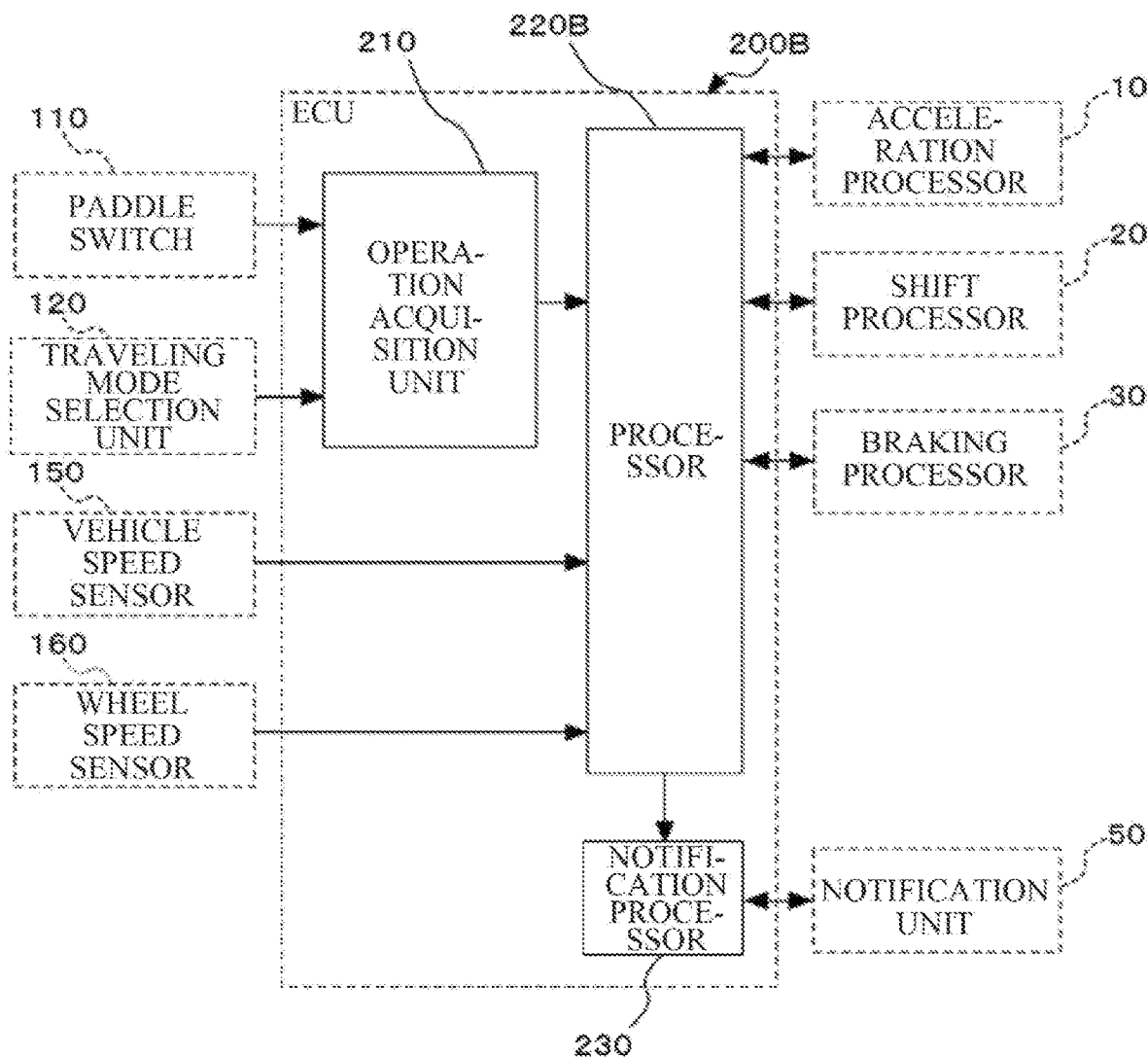
FIG. 9 is a configuration diagram illustrating an ECU of the vehicle control apparatus 1B according to the modification of one example embodiment of the disclosure.
Figure 10:
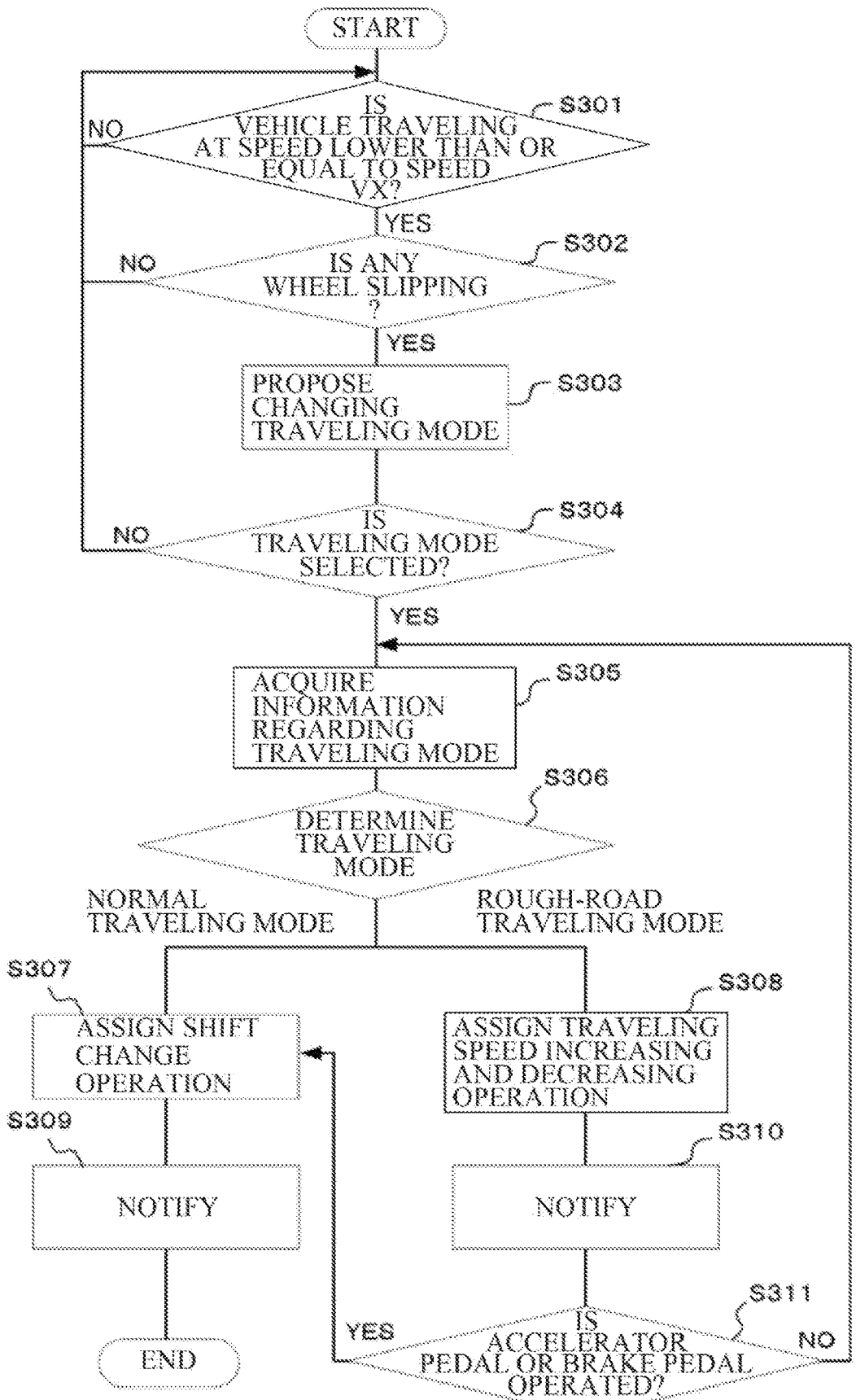
FIG. 10 is a flowchart illustrating a process to be performed by the ECU of the vehicle control apparatus 1B according to the modification of one example embodiment of the disclosure.

Referring to FIGS. 8 to 10, a description is provided of a configuration of the vehicle control apparatus 1B according to an example embodiment of the disclosure. The vehicle control apparatus 1B may be provided in the vehicle V.

[Configuration of Vehicle Control Apparatus 1B]

As illustrated in FIG. 8, the vehicle control apparatus 1B may include the paddle switch 110, the traveling mode selection unit 120, a vehicle speed sensor 150, a wheel speed sensor 160, and an ECU 200B. Coupled to the vehicle control apparatus 1B may be the acceleration processor 10, the shift processor 20, the braking processor 30, and the notification unit 50.

The vehicle speed sensor 150 may be configured to detect a moving speed of the vehicle V. The vehicle speed sensor 150 may detect the moving speed of the vehicle V, and may output information indicating a vehicle speed to the ECU 200B.

The wheel speed sensor 160 may be provided on each of the wheels of the vehicle V. The wheel speed sensor 160 may detect a rotation speed of the corresponding one of the wheels, and may transmit wheel rotation speed information to the ECU 200B.

[Configuration of ECU 200B]

As illustrated in FIG. 9, the ECU 200B may include the operation acquisition unit 210, a processor 220B, and the notification processor 230. Coupled to the ECU 200B may be the paddle switch 110, the traveling mode selection unit 120, the vehicle speed sensor 150, the wheel speed sensor 160, the acceleration processor 10, the shift processor 20, the braking processor 30, and the notification unit 50.

When the processor 220B acquires, from the vehicle speed sensor 150, information indicating that the vehicle speed of the vehicle V is lower than or equal to a speed VX as a predetermined moving speed, and acquires, from the wheel speed sensor 160, information indicating that the wheels are exhibiting predetermined wheel behavior, the processor 220B may estimate that the condition of the road surface on which the vehicle V is traveling is unstable, based on information stored in the storage. Further, the processor 220B may propose changing the traveling mode to the "rough-road traveling mode", to the driver P via the notification unit 50.

Here, the speed VX as the predetermined moving speed may be 40 km/h, for example. The predetermined wheel behavior may be slipping of any of the wheels, for example. For example, the processor 220B may recognize that any of the wheels of the vehicle V is slipping, based on information indicating a rapid increase in the rotation speed of the wheel.

In other words, for example, when the processor 220B acquires information indicating that the vehicle V is traveling at a speed lower than or equal to the speed VX and also acquires information indicating that any of the wheels is slipping, the processor 220B may estimate that the condition of the road surface on which the vehicle V is traveling is unstable. Further, the processor 220B may transmit information proposing a change to the "rough-road traveling mode" to the notification unit 50 via the notification processor 230. The notification unit 50 may propose changing the traveling mode to the "rough-road traveling mode" to the driver P by means of the image information outputted via the meter panel MP or the audio information outputted via the speaker. In this case, in one example, the processor 220B may notify, via the notification unit 50, the driver P of information indicating that the wheel is slipping or information indicating to wait for a rescue. In another example, the processor 220B may cause a hazard lamp to blink via the notification unit 50 to notify the driver P of the information indicating that the wheel is slipping or the information indicating to wait for a rescue.

[Process to be Performed by ECU 200B]

Referring to FIG. 10, a process to be performed by the ECU 200B will be described.

The processor 220B may determine whether the vehicle V is traveling at a speed lower than or equal to the speed VX, based on information supplied from the vehicle speed sensor 150 (step S301). If the processor 220B determines that the vehicle V is not traveling at a speed lower than or equal to the speed VX (step S301: NO), the processor 220B may cause the process to return to step S301.

If the processor 220B determines that the vehicle V is traveling at a speed lower than or equal to the speed VX (step S301: YES), the processor 220B may determine whether any of the wheels is slipping, based on information supplied from the wheel speed sensor 160 (step S302).

If the processor 220B determines that none of the wheels is slipping (step S302: NO), the processor 220B may cause the process to return to S301.

If the processor 220B determines that any of the wheels is slipping (step S302: YES), the processor 220B may propose changing the traveling mode to, to the driver P via the notification unit 50 (step S303). Thereafter, the processor 220B may cause the process to proceed to step S304.

The processor 220B may determine whether the traveling mode is selected by the traveling mode selection unit 120 (step S304). If the processor 220B determines that the traveling mode is not selected (step S304: NO), the processor 220B may cause the process to return to step S301.

If the processor 220B determines that the traveling mode is selected (step S304: YES), the processor 220B may acquire, via the operation acquisition unit 210, information regarding the traveling mode selected by the traveling mode selection unit 120 (step S305), and may determine the traveling mode based on the acquired information (step S306).

If the selected traveling mode is the "normal traveling mode" (step S306: "NORMAL TRAVELING MODE"), the processor 220B may assign the shift change operation to the operation mode of the paddle switch 110 (step S307).

Further, the processor 220B may notify, via the notification unit 50, the driver P of information indicating that the shift change operation is assigned to the operation mode of the paddle switch 110 (step S309). Thereafter, the processor 220B may end the process.

If the selected traveling mode is the "rough-road traveling mode" (step S306: "ROUGH-ROAD TRAVELING MODE"), the processor 220B may assign the traveling speed increasing and decreasing operation to the operation mode of the paddle switch 110 (step S308).

Further, the processor 220B may notify, via the notification unit 50, the driver P of information indicating that the traveling speed increasing and decreasing operation is assigned to the operation mode of the paddle switch 110 (step S310). Thereafter, the processor 220B may cause the process to proceed to step S311.

The processor 220B may determine whether the accelerator pedal AP or the brake pedal BP is operated (step S311). If the processor 220B determines that the accelerator pedal AP or the brake pedal BP is not operated (step S311: NO), the processor 220B may cause the process to return to step S305.

If the processor 220B determines that the accelerator pedal AP or the brake pedal BP is operated (step S311: YES), the processor 220B may cause the process to proceed to step S307, and may assign the shift change operation to the operation mode of the paddle switch 110 (step S307).

Further, the processor 220B may notify, via the notification unit 50, the driver P of the information indicating that the shift change operation is assigned to the operation mode of the paddle switch 110 (step S309). Thereafter, the processor 220B may end the process.

[Workings and Example Effects]

As described above, the vehicle control apparatus 1B according to the example embodiment may further include the vehicle speed sensor 150 and the wheel speed sensor 160. When the processor 220B acquires, from the vehicle speed sensor 150, the information indicating that the vehicle V is traveling at a speed lower than or equal to the speed VX and acquires, from the wheel speed sensor 160, the information indicating that any of the wheels is slipping, the processor 220B may estimate that the condition of the road surface on which the vehicle V is traveling is unstable based on the information stored in the storage. Further, the processor 220B may propose changing the traveling mode to the "rough-road traveling mode", to the driver P via the notification unit 50.

That is, by estimating that the vehicle V is traveling on a rough road based on the information indicating that the traveling speed of the vehicle V is decreased and the information indicating that any of the wheels is slipping, the processor 220B may be able to propose, to the driver P, selecting the "rough-road traveling mode" that allows for a safe operation of the vehicle V.

It is therefore possible to make the vehicle operation based on the road surface condition easier.

In some embodiments, it is possible to implement any of the vehicle control apparatuses 1 to 1B of the example embodiments of the disclosure by recording the process to be executed by corresponding one of the ECUs 200 to 200B on a non-transitory recording medium readable by a computer system, and causing the computer system to load the program recorded on the non-transitory recording medium onto the corresponding one of the ECUs 200 to 200B to execute the program. The computer system as used herein may encompass an operating system (OS) and a hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

According to one or more example embodiments of the disclosure, it is possible to make a vehicle operation based on a road surface condition easier.

Each of the ECU 200 illustrated in FIG. 2, the ECU 200A illustrated in FIG. 5, and the ECU 200B illustrated in FIG. 8 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the ECU 200 illustrated in FIG. 2, the ECU 200A illustrated in FIG. 5, and the ECU 200B illustrated in FIG. 8. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the ECU 200 illustrated in FIG. 2, the ECU 200A illustrated in FIG. 5, and the ECU 200B illustrated in FIG. 8.

The invention claimed is:

1. A vehicle control apparatus comprising:
   paddle switches provided on each side of a steering wheel in a vehicle width direction of a vehicle, the paddle switches being configured to allow for a shift change operation and a traveling speed control operation;
   a traveling mode selection unit configured to allow a driver who drives the vehicle to select a desired traveling mode from traveling modes; and an electronic control unit configured to change an operation mode of the paddle switches to the shift change operation or the traveling speed control operation based on information supplied from the traveling mode selection unit, and configured to control corresponding one of a shift change and a traveling speed based on an operation performed on the paddle switches, wherein after switching the operation mode of the paddle switches to the traveling speed control operation, the electronic control unit is further configured to activate a braking system upon detecting simultaneous operation of the paddle switches.

2. The vehicle control apparatus according to claim 1, wherein the electronic control unit is configured to, when a first traveling mode is selected as the desired traveling mode, control the traveling speed based on the operation performed on the paddle switches, the first traveling mode being a traveling mode in which a traction control of a wheel is performed automatedly.

3. The vehicle control apparatus according to claim 2, wherein the electronic control unit is configured to change a control based on the operation performed on the paddle switches from a control of the traveling speed to a control of the shift change when a braking operation or an acceleration operation is performed on a vehicle device of the vehicle other than the paddle switches while the electronic control unit is controlling the traveling speed based on the operation performed on the paddle switches.

4. The vehicle control apparatus according to claim 1, wherein the electronic control unit is configured to change a control based on the operation performed on the paddle switches from a control of the traveling speed to a control of the shift change when a braking operation or an acceleration operation is performed on a vehicle device of the vehicle other than the paddle switches while the electronic control unit is controlling the traveling speed based on the operation performed on the paddle switches.

5. The vehicle control apparatus according to claim 1, further comprising
   a notification unit configured to perform a notification to the driver; and
   a notification processor coupled to the notification unit, wherein
   the electronic control unit is configured to, when changing the operation mode of the paddle switches from the traveling speed control operation to the shift change operation or from the shift change operation to the traveling speed control operation, notify the driver of information via the notification unit, the information indicating that the operation mode of the paddle switches is to be changed.

* * * * *